United States Patent [19]

Alhamad

[11] Patent Number: 5,638,662
[45] Date of Patent: Jun. 17, 1997

[54] IMPACT ABSORBER

[76] Inventor: Shaikh Ghaleb Mohammad Yassin Alhamad, P.O. Box 31590, Riyadh, Saudi Arabia, 11418

[21] Appl. No.: 467,863

[22] Filed: Jun. 6, 1995

Related U.S. Application Data

[60] Division of Ser. No. 226,955, Apr. 13, 1994, Pat. No. 5,500,037, which is a continuation-in-part of Ser. No. 784,171, Oct. 25, 1991, abandoned, which is a continuation-in-part of Ser. No. 605,540, Oct. 29, 1990, Pat. No. 5,142,755, which is a division of Ser. No. 417,696, Oct. 5, 1989, Pat. No. 5,001,017, which is a continuation of Ser. No. 280,317, Dec. 6, 1988, abandoned.

[51] Int. Cl.$^6$ .............................. B65B 23/00; B65B 61/22
[52] U.S. Cl. ................... 53/472; 29/17.4; 53/461; 206/591
[58] Field of Search ............... 53/472, 461; 29/6.1, 29/17.4; 206/592, 591, 521; 493/968

[56] References Cited

U.S. PATENT DOCUMENTS

| | | | |
|---|---|---|---|
| 600,212 | 3/1898 | Woodman | 169/50 |
| 767,723 | 8/1904 | Terpening | 428/256 |
| 869,116 | 10/1907 | Wade . | |
| 1,086,707 | 2/1914 | Hoagland . | |
| 1,334,796 | 3/1920 | Robinson . | |
| 1,439,954 | 12/1922 | Emerson . | |
| 1,474,390 | 11/1923 | Trowbridge et al. | 109/83 |
| 1,694,542 | 12/1928 | Hedden . | |
| 1,739,754 | 12/1929 | Foster . | |
| 2,340,370 | 2/1944 | Doyle | 169/2 |
| 2,765,046 | 10/1956 | Rondholz . | |
| 2,836,863 | 6/1958 | Denker | 20/91 |
| 2,931,751 | 4/1960 | DuFresne | 428/29 |
| 3,017,019 | 1/1962 | Cahill | 206/591 X |
| 3,130,890 | 4/1964 | McCormack | 206/591 X |
| 3,192,098 | 6/1965 | Phillips | 161/41 |
| 3,225,509 | 12/1965 | May | 206/591 X |
| 3,284,980 | 11/1966 | Dinkel | 52/600 |
| 3,304,219 | 2/1967 | Nickerson | 206/591 X |
| 3,320,716 | 5/1967 | Schafer | 53/472 X |
| 3,356,256 | 12/1967 | Szego | 220/88 |
| 3,431,818 | 3/1969 | King | 109/80 |
| 3,437,457 | 4/1969 | Fisher | 29/182.2 |
| 3,459,026 | 8/1969 | Allen et al. | 72/324 |
| 3,465,566 | 9/1969 | Allen | 72/324 |
| 3,498,404 | 3/1970 | Roberts | 181/33 |
| 3,648,613 | 3/1972 | Cunn | 109/49.5 |
| 4,149,649 | 4/1979 | Szego | 29/6.1 |
| 4,179,979 | 12/1979 | Cook et al. | 109/49.5 |
| 4,248,342 | 2/1981 | King et al. | 206/591 X |
| 4,249,669 | 2/1981 | Szego | 220/216 |
| 4,292,882 | 10/1981 | Lausen | 109/49.5 |
| 4,299,872 | 11/1981 | Miguel et al. | 428/117 |
| 4,325,309 | 4/1982 | King et al. | 109/49.5 |

(List continued on next page.)

FOREIGN PATENT DOCUMENTS

| | | |
|---|---|---|
| 2440892 | 6/1980 | France . |
| 3435457 | 4/1986 | Germany . |
| 554562 | 7/1943 | United Kingdom . |
| 2067105 | 7/1981 | United Kingdom . |

OTHER PUBLICATIONS

Abstract only: 115870e Japan—Wood Cement Board, Mar. 1984.

Kirkbride, R., et al, "Fuel Vapor Canister Fires Simulation Tests", VRTC-71-0211, Jul. 1991, pp. 1-2, 5-6, 13-14, 18, 11-13.

*Primary Examiner*—James F. Coan
*Attorney, Agent, or Firm*—Charles E. Cates; Frank T. Barber

[57] ABSTRACT

A highly efficient impact absorber for protecting articles against destructive mechanical impact. The invention has special applicability to containers for flammable materials, scientific instruments, or other fragile mechanisms or articles which may be damaged or become hazardous when ruptured. The impact absorber comprises a layer or layers of expanded metal net made from magnesium alloy foil having a thickness in the range from about 0.02 to 0.50 mm. A preferred embodiment comprises a contained layer or layers of nested spheroids formed from expanded metal sheets made from magnesium foil.

3 Claims, 2 Drawing Sheets

U.S. PATENT DOCUMENTS

| | | | |
|---|---|---|---|
| 4,349,398 | 9/1982 | Kearns et al. | 156/71 |
| 4,361,190 | 11/1982 | Szego | 169/48 |
| 4,405,076 | 9/1983 | Lines, Jr. et al. | 428/921 |
| 4,454,702 | 6/1984 | Bonilla-Lugo | 52/745 |
| 4,523,448 | 6/1985 | Sakai et al. | 72/185 |
| 4,557,961 | 12/1985 | Gorges | 428/117 |
| 4,621,397 | 11/1986 | Schrenk | 29/6.1 |
| 4,727,789 | 3/1988 | Katsanis et al. | 109/49.5 |
| 4,785,602 | 11/1988 | Giurlani | 52/309.12 |
| 4,828,932 | 5/1989 | Morimoto et al. | 428/608 |

IMPACT ABSORBER

This application is a divisional of application Ser. No. 08/226,955, filed on Apr. 13, 1994, now U.S. Pat. No. 5,500,037, which is a continuation-in-part of Ser. No. 07/784,171, filed Oct. 25, 1991, and now abandoned, which is a continuation-in-part of Ser. No. 07/605,540, filed Oct. 29, 1990, now U.S. Pat. No. 5,142,755; which is a division of Ser. No. 07/417,696, filed Oct. 5, 1989, now U.S. Pat. No. 5,001,017, granted Mar. 19, 1991; which is a Continuation of Ser. No. 07/280,317, filed Dec. 6, 1988, abandoned.

BACKGROUND AND PRIOR ART

The present invention relates to an impact absorber adapted to protect articles against destructive mechanical impact. The invention has special applicability to containers for flammable materials, scientific instruments, or other fragile mechanisms or articles which may be damaged or become hazardous when ruptured.

Although the invention is useful in a wide variety of industrial, commercial, and household situations, it may be specifically illustrated by reference to the protection of articles in the automotive field. As is well known, automobile collisions continue to cause a staggering loss of life and property, and there is a continuing major effort by automobile companies, insurance companies, consumer groups and governmental agencies to find ways of overcoming this national problem. Part of the problem is caused by the fact that present day vehicles carry on-board tanks for fuel or canisters for other flammable materials, and the rupture of these in a collision is the cause for the fire and explosion which accounts for a great many of the injuries, death and loss of property in the automotive field.

For example, in addition to the gasoline tank, automobiles have, since 1971, carried an evaporative canister, designed to capture hydrocarbon emissions during engine operation. Both these containers are prone to rupture and explode as a result of a collision. Now, as an added risk, the U.S. Environmental Protection Agency, under provisions of the 1990 Clean Air Act Amendments, has been directed to issue a rule mandating that all new U.S.-manufactured cars be equipped with a new device called an on-board refueling vapor recovery system. (Kirkbride, R. et al, "Fuel Vapor Canister Fire Simulation Tests", Final Report from the Vehicle Research and Test Center to the National Highway Traffic Safety Administration, VRTC-71-0211, July 1991.) The new device is a larger version of the evaporative canister already in place. The new device will consist of a larger plastic canister containing enough activated charcoal pellets to capture the hydrocarbon vapor purged from an auto tank during refueling. Fugitive hydrocarbon vapors from this source have been linked to the degradation of local air quality, giving rise to episodes of high ozone and smog, which endanger personal health. Since the rupture of such canisters upon collision can lead to the spillage of hydrocarbon saturated charcoal pellets, and subsequent ignition and explosion, it is the consensus that the fire risk in automobile collisions will be substantially increased if these canisters are made mandatory.

It is the object of the present invention to provide an impact absorber for the protection of canisters of this type and other similar containers.

It is another object of the invention to provide a protective shield which not only resists the effects of mechanical impact but also acts to contain the spillage of hydrocarbon saturated solids in the canister and to prevent ignition of the same in the event spillage should occur.

It is a further object to provide an impact absorber which is extremely light, durable, simple and inexpensive to manufacture, easy to assemble, and relatively maintenance-free.

Other objects and advantages will become apparent as the specification proceeds.

SUMMARY OF THE INVENTION

This invention is based on the discovery that rupturable containers holding flammable materials or other fragile articles may be protected against rupture by wrapping them in a blanket formed from a layer or layers of expanded metal net made from magnesium alloy foil having a thickness in the range from about 0.02 to 0.50 mm. In the automotive field, this blanket has demonstrated the ability not only to absorb the mechanical impacts associated with automobile collisions but also to contain the spillage of solids in the containers as well as arresting the ignition of vapors in the container, in the event rupture does take place.

The product of the invention therefore is an impact absorber for protecting an article against destructive mechanical impact, comprising at least one layer of expanded metal net made from magnesium alloy foil having a thickness in the range from about 0.02 to 1.00 mm. In a preferred embodiment, the impact absorber comprises a layer of nested spheroids formed from expanded metal sheets made from magnesium alloy foil, said layer being contained between layers of expanded metal sheets made from magnesium foil.

The invention also includes a method for protecting articles against destructive mechanical impact comprising covering the article with the above-described impact absorber.

The invention is applicable to the protection of on-board fuel tanks and vapor canisters in vehicles, but may also be used in a wide variety of industrial, commercial, and household situations.

BRIEF DESCRIPTION OF THE DRAWINGS

FIG. 1-A is a cross-sectional view of a section of the impact absorber, showing a layer of ellipsoids contained between two sheets of expanded metal net.

DETAILED DESCRIPTION OF THE INVENTION

Figures 1, 1A:
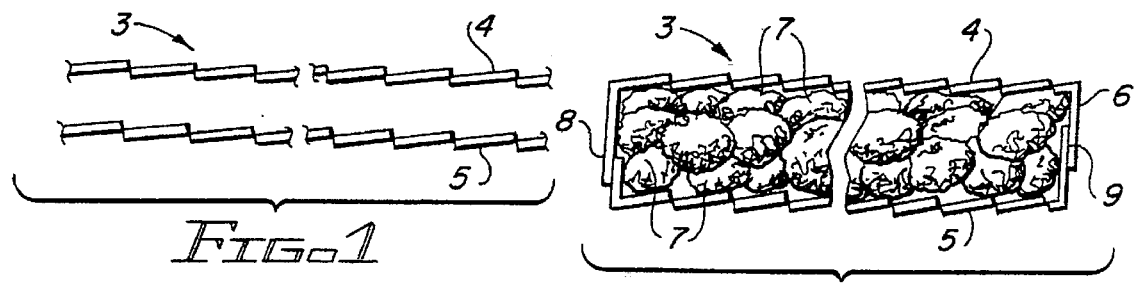
FIG. 1 is a cross-sectional view of a section of the impact absorber of the present invention, showing the use of two layers of expanded metal net.

Referring to the drawings, the basic structure of the impact absorber of the present invention is shown in FIG. 1, wherein the absorber 3 includes 2 layers 4 and 5 formed from expanded metal sheets made from magnesium alloy foil.

FIG. 1A shows the structure of the embodiment in which the impact absorber comprises a layer 6 of nested ellipsoids 7 contained between sheets 4 and 5 of expanded metal foil. Although not essential to the invention, it is desirable for certain purposes that the edges of sheets 4 and 5 be brought together and bound by stitching, stapling or other known fastening means at seams 8 and 9. The impact absorber may be square, rectangular, round, or any other shape to fit the cross-section of the pipe in which it is placed.

Figures 2, 3, 4, 5:
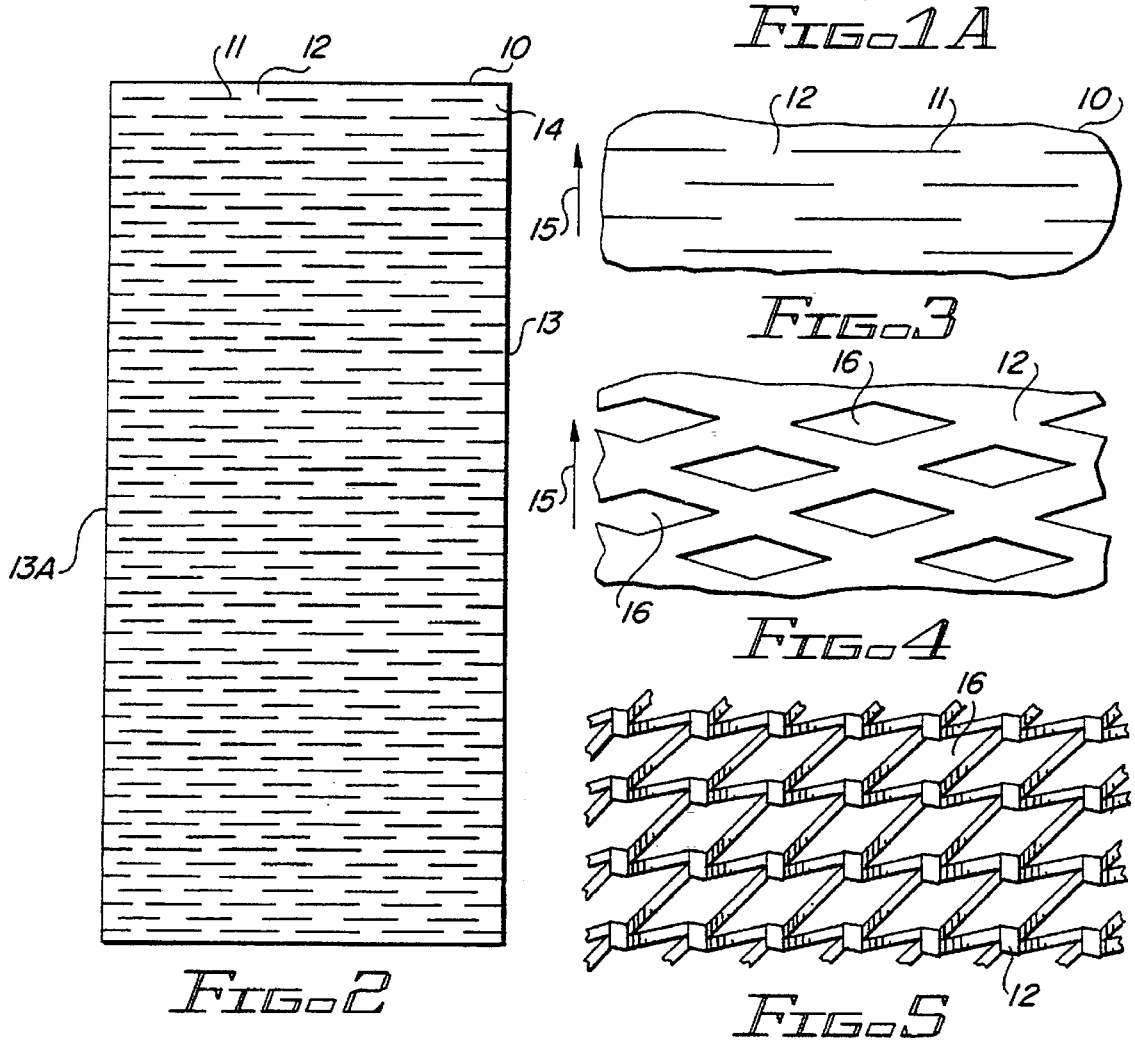
FIG. 2 is a top view of a slitted magnesium alloy foil sheet, which can be expanded by stretching to provide the expanded metal net usable in the present invention.
FIGS. 3 through 6 are top views of the expanded metal net, showing the changes in configuration as the slitted sheet is pulled to open up the expanded metal net.

The expanded metal employed in producing the ellipsoids 7 and the sheets 4 and 5 is formed by slitting a continuous sheet of magnesium alloy metal foil in a specialized manner and then stretching the slitted sheet to convert it to an expanded prismatic metal net having a thickness substantially greater than the thickness of the foil. Referring to the drawings, FIG. 2 shows a sheet of metal foil 10 provided with discontinuous slits appropriate for the present invention. The length and width of the sheet may be chosen from any number of practical dimensions, depending on the size of the impact absorber to be produced.

As noted in FIG. 2, sheet 10 is provided with discontinuous slits 11 in spaced apart lines which are parallel to each other but transverse to the longitudinal dimension of the sheet 10. The slits 11 in each line are separated by unslit segments or gaps 12, and it will be noted that the slits 11 in each line are offset from the slits 11 in adjacent lines. Similarly, the gaps 12 in each line are offset from the gaps 12 in adjacent lines. The lines of slits run parallel to the longitudinal edges 13 and 13A of the continuous sheet of metal foil. Methods and apparatus for producing the slitted metal foil are described in detail in U.S. Pat. No. 5,095,597, dated Mar. 17, 1992 and U.S. Pat. No. 5,142,735, dated Sep. 1, 1992.

When the slitted metal foil as shown in FIG. 2 is stretched by subjecting it to longitudinal tension, it is converted into an expanded metal prismatic net, usable as elements 4 and 5 of the present invention. In the stretching procedure, the horizontal surfaces of foil are raised to a vertical position, taking on a honeycomb-like structure. This conversion is shown in FIGS. 3 through 6 of the drawings. The slitted metal foil 10 is shown in FIG. 3 prior to stretching. When longitudinal tension is applied in the direction of arrow 15, the slits 11 begin to open and are converted to eyes 16, and the product assumes the appearance shown in FIG. 4. The application of more tension causes a greater opening of the slits, and the product expands into the honeycomb-like, prismatic form shown in FIG. 5. When even further tension is applied, the configuration reaches its desired end point, as in FIG. 6. The conversion illustrated in FIGS. 3 through 6 is accompanied by an increase in thickness of the product, the final thickness of the honeycomb product being approximately twice the value of the space 14 between each line of slits. Each eye of the expanded sheet has a three-dimensional structure having eight corner points.

Figure 7:
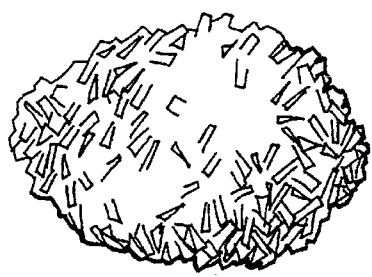
FIG. 7 is a perspective view showing the ellipsoid form made from the expanded metal net, for use in the present invention.
Figure 6:
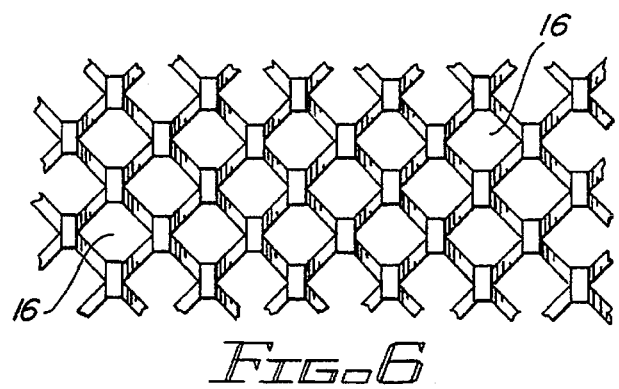

The ellipsoids 7 are produced by cutting the expanded metal net sheets 4 or 5 into small segments which are then mechanically formed into small ellipsoids, as illustrated in FIG. 7. The ellipsoids 7 generally have a short diameter in the range of 20 to 30 mm, and a long diameter in the range of 30 to 45 mm, with the distance between focal points measuring approximately two-thirds of the long diameter of the ellipsoid. Their ellipsoid shape causes them to nestle closely together when placed in a contained position, so that complete surface coverage is obtained, with no gaps through which flame can pass. Apparatus for producing these ellipsoids is described in detail in U.S. Pat. No. 5,207,756, dated May 4, 1993.

For the impact absorber usage of the present invention, it is desired that the metal foil be very thin and that the slits in each line and the spaces between the lines be very small. Thus, the thickness of the foil used to produce the metal net should be in the range between 0.028 and 1.0 mm, and the preferred thickness is between 0.2 and 1.0 mm. The length of each slit 11 is in the range between 1 and 2.5 cm, and the unslit sections or gaps 12 between each slit are in the range between 2 to 6 mm long. The distance separating lines of slits may be varied, depending on the thickness desired for the resulting expanded metal net. The distance 14 is ordinarily in the range between 1 and 4 mm, so that the thickness of the resulting expanded metal net is normally in the range between about 2 and 8 mm. The preferred value for distance 14 is either 1 mm or 2 mm.

The kind of metal used in the metal foil should be an alloy of magnesium with suitable compatible substances. Thus, for example, it is desirable to use an alloy of magnesium with substances such as aluminum, copper, zirconium, zinc, strontium, Rn(electron), silicon, titanium, iron, manganese, chremium, and combinations thereof. Alloys such as the above have the valuable characteristic of not only being lightweight, strong, elastic, heat-conductive, etc., but also the important characteristic of being nonflammable at high temperatures. A particularly useful combination is the alloy of magnesium with aluminum and copper. Another preferred combination is the alloy of magnesium with zirconium and strontium. The invention is illustrated in a specific example by an alloy comprising 0.25% Si, 0.3% Fe, 0.01% Cu, 0.01% Mn, 10% Al, 0.1% Zn, 0.08% Ti, and the remainder Mg. Such a product possess tensile strength of 300 N/mm, proof stress of 200 n/mm, elongation of 10%, and Brinell hardness of (5/250-30).

For certain uses, the expanded metal foil used in the present invention may be combined with other materials. For example, if the foil is coated with an alkaline bichromate, the resulting expanded metal net acts as a corrosion inhibitor, since the bichromate acts to remove water from fuels and their containers. Further, if the metal foil is combined with oleates or similar compounds, the fire extinguishing capability of the expanded metal net is enhanced, since the oleate emits a dense vapor which assists in smothering the flame.

Figure 8:
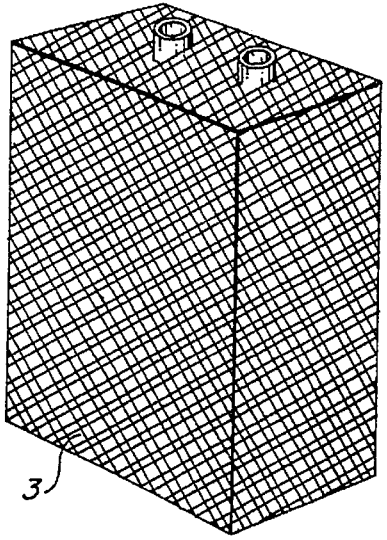
FIG. 8 is a perspective view showing a canister blanketed with the impact absorber of the present invention.
Figure 9:
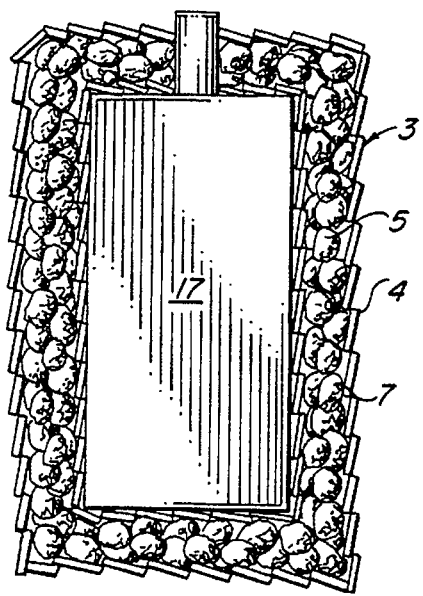
FIG. 9 is a cross-sectional side view of a canister blanketed with the impact absorber.

FIG. 8 illustrates the impact absorber 3 of the present invention applied as a blanket around a typical evaporative fuel canister as currently in use in automobiles. FIG. 9 shows a side cross-sectional view of the blanket 3 around the canister 17. As indicated, the impact absorber 3 comprises a layer of nested ellipsoids 7 contained between expanded metal sheets 4 and 5. When a canister 17 protected by the blanket 3 is subjected to impact tests simulating those of an automobile collision, the blanket shows a remarkable ability to prevent rupture of the canister. The following Examples I and II illustrate the effectiveness of the present invention.

EXAMPLE I

Impact Tests—Without the Presence of Flame

The techniques adopted for these impact tests were those developed by the U.S. National Highway Traffic Safety Administration (NHTSA) to estimate the fire risk posed by on-board refueling vapor recovery canisters. (Kirkbride et al, supra.) Because such canisters are not available, the tests were conducted using evaporative canisters as surrogates (as did the NHTSA). Refueling vapor recovery canisters are expected to be similar in design to evaporative canisters, but larger in capacity.

Impact tests consisted of subjecting charcoal-filled, but gasoline-free, evaporative canisters to a simulated low-speed crash, and characterizing any loss in integrity and spillage. The NHTSA had determined that the damage experienced by evaporative canisters upon a real low-speed crash could be reliably recreated using a simple metal pendulum 18, shown in FIG. 10.

The pendulum 18 consisted of a 15-cm (6-in) diameter, 15-cm tall, 21.3 kilogram (47-lb) cylinder 19, suspended from a 3.3-kg (7.5-lb) rod 20, 160-cm (63-in) long and 2-cm (0.75-in) in diameter. When dropped 150 cm (5 ft) along the course shown by the arrow 26, the impact speed at the canister is 16 kilometers/hour (10 miles/hour), yielding a force of ~690 kp (100 psi). Lateral play was incorporated into the pivot 21 of the pendulum 18 so that the head 19 would not recoil upon impact, and hit the target canister 17 more than once.

The pendulum 18 was mounted onto a top corner 22 of the below-ground pit 23. The canister 17 was mounted to the wall 24 near the bottom of the pit 23.

Figure 10:
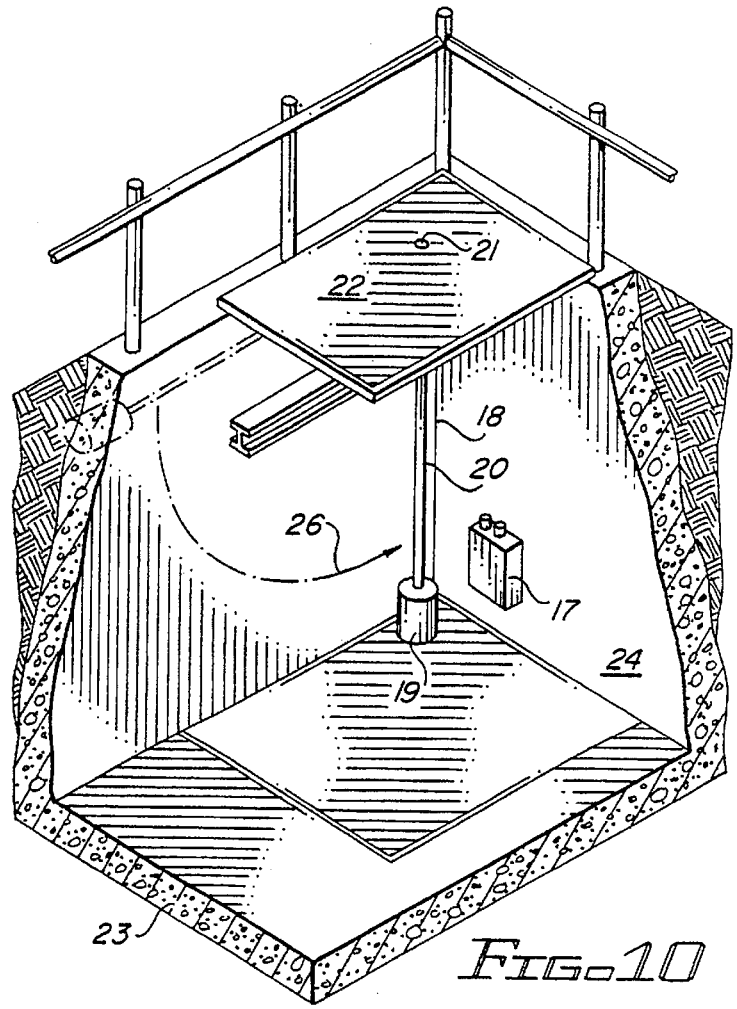
FIG. 10 is a perspective schematic showing the below-ground bunker and the equipment used for making the tests described in Example I hereof.

The first impact tests were conducted in triplicate upon the unprotected canister 17, as shown in FIG. 10. Upon impact, the plastic canister 17 shattered, spilling its charcoal granules over a radius of ~90 cm (3 ft). These results are similar to those obtained by the NHTSA (Kirkbride et al, supra).

Next, the impact tests were repeated, but with one layer of the ellipsoids 7 of the present invention (34 in total) wrapped in expanded metal net sheets 4 and 5, surrounding the front, top, and sides of a canister 17. Upon impact, the canister split, but without expelling any charcoal pellets. Tests with two layers of ellipsoids 7 in front of the canister 17 prevented fracture altogether.

These comparative tests demonstrate that the impact absorber of the present invention has secondary fire-safety attributes. Namely, the absorber has a capacity for absorbing the impact of a simulated low-speed collision, as well for containing the spillage of charcoal pellets when fracture occurred.

EXAMPLE II

Impact Tests—In the Presence of Flame

Figure 11:
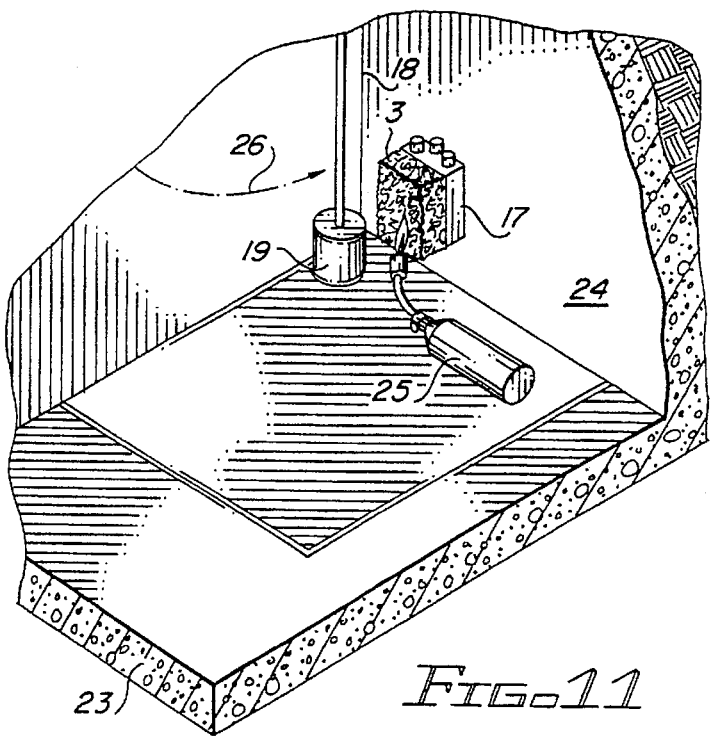
FIG. 11 is a fragment of the view of FIG. 10, but modified to show the use of the impact absorber of the present invention and the torch flame used in the tests described in Example II hereof.

The NHTSA has determined that when a fuel vapor recovery canister, whose charcoal was ≧50% saturated with gasoline, was subjected to impact in the presence of a flame, a fire occurred that was "60–90 cm (2–3 ft) in length" and "explosive" (Kirkbride et al, supra). In the present test, baseline canister impact-fire tests consisted of repeating the impact tests of Example I, but with canisters saturated with gasoline, and in proximity with a flame-ignition source. The experimental setup is shown in FIG. 11. These conditions, saturation with gasoline and flame-ignition, had been determined by the NHTSA to result in the highest incidence of fire upon impact. Saturation was achieved by pumping gasoline vapors into the inlet of a canister 17 until the smell of gasoline was detected at the outlet. At this break-through point, ~150 g of gasoline (0.3 lb) had been added to the canister, the walls of which became warm to the touch because of exothermic adsorption. The ignition system consisted of a torch 25, mounted such that its flame was located at the center of the charcoal-pellet spill area, pointing to the base of the canister 17.

The first tests in this Example II were conducted on the unprotected canister 17. Upon impact, the canisters in each test shattered, as before, spilling gasoline-laden charcoal into the same ~90 cm radial pattern. This time, however, fireballs occurred, similar to those observed by the NHTSA. These tests were conducted in triplicate and yielded reproducible results.

Next, these tests were repeated in triplicate, but with the same "shield" of ellipsoids of the present invention, as used in Example I. Although the canisters split upon impact, no charcoal was released, and no ignition or fire occurred. Charcoal spillage and fire did not occur even after multiple (5) impacts, despite more extensive damage to the canister.

These results provide compelling evidence of the impact-resistance, spill-containment, and fire-avoidance capacity of the impact absorber of the present invention in an automotive-specific application.

Although preferred embodiments of the invention have been described herein in detail in connection with applications in the automotive environment, it will be understood by those skilled in the art that the invention is equally applicable in other industrial, commercial and household situations, where variations may be applied without departing from the spirit of this invention.

What is claimed is:

1. A process for protecting an article against destructive mechanical impact comprising covering said article with an impact absorber comprising a contained layer of nested ellipsoids formed from expanded metal sheets made from magnesium foil.

2. A process as in claim 1 wherein said spheroids are contained between layers of expanded metal sheets made from magnesium foil.

3. A process as in claim 1 wherein the short diameter of said ellipsoids is in the range of 20 to 30 mm and the long diameter is in the range of 30 to 45 mm.

* * * * *